Sept. 16, 1952 A. VORMS 2,611,028

TELEVISION TRANSMISSION SYSTEM

Filed Oct. 19, 1949

INVENTOR
ARMAND VORMS
BY
Bailey, Stephens & Huettig
ATTORNEYS

Patented Sept. 16, 1952 2,611,028

UNITED STATES PATENT OFFICE 2,611,028

TELEVISION TRANSMISSION SYSTEM

Armand Vorms, Paris, France, assignor to Society "La Radio Industrie," S. A., Paris, France, a society of France Application October 19, 1949, Serial No. 122,201
In France October 26, 1948

1 Claim. (Cl. 178—7.1)

My invention relates to electric transmission systems making use of synchronizing signals or pulses, in particular to maintain synchronism between two operations taking place respectively at a transmitter and at a receiver, as it is the case, in particular, for television.

It is known that in television systems, there are introduced into the carrier current or into the modulated wave used for transmission between transmitter and receiver, synchronizing pulses of various kinds, these pulses being for instance in particular characterized either by an amplitude modulation or by a frequency modulation. In particular, it was proposed, in television—in two patent applications filed in United States on February 4, 1942, Ser. No. 429,584, by Mr. Henri de France for "Improvements in Television Methods and Systems," and on March 29, 1949, Ser. No. 84,082, by Mr. Henri de France for "Improvements in the Transmission and Reception of Radioelectric Signals, More Especially for Synchronizing Television Pictures"—to make use, to synchronize line scanning, of amplitude modulated pulses, and, to synchronize frames, of frequency modulated pulses, in particular obtained by a temporary modification of the carrier.

The chief object of the present invention is to extend the use of such combined signals.

It consists chiefly in adopting for the synchronizing signals, at the transmitter, at least two different characteristics suitable for receivers also of different types and, in particular, concerning frame synchronizing pulses in television systems, in providing simultaneously two kinds of pulses, some of which are amplitude modulated and the others frequency modulated.

Another feature of my invention consists, in television systems including a series of line synchronizing pulses and a series of frame synchronizing pulses both of these series of pulses being amplitude modulated, in arranging the frame pulses in such manner that their duration is shorter than the time interval between two line pulses.

Preferred embodiments of my invention will be hereinafter described with reference to the accompanying drawings, given merely by way of example and in which.

The following description will relate to a television system making use of synchronizing pulses to maintain synchronism between scannings at the transmitter and at the receiver, respectively.

According to my invention, for at least one of the two series of pulses (line synchronizing pulses and frame synchronizing pulses), I simultaneously transmit at least two types of pulses of different characteristics, in particular amplitude modulated pulses and frequency modulated pulses.

Such an arrangement is advantageous, in particular to permit of receiving the same transmission with receivers of different kinds, that is to say, for instance, receivers capable of receiving and separating, for synchronizing purposes, amplitude modulated pulses, and receivers capable of receiving and separating frequency modulated pulses.

Figure 2:
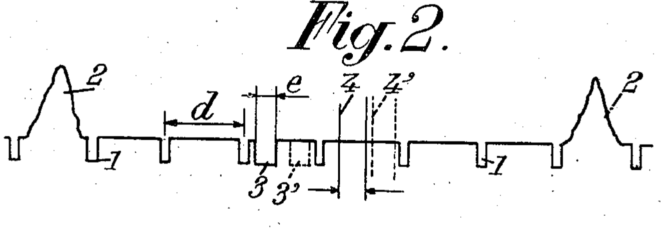
Fig. 2 is a carrier synchronizing pulse waveforms corresponding to such a transmitter.

For instance, supposing that the line synchronizing pulses (which may, by way of example only, have a frequency of 40,950 cycles per second and a length of 1.5 $\mu$s.) are always amplitude modulated (although the above specified mixed synchronizing might also be applied), as shown at 1 on Fig. 2, where 2 shows the videofrequency modulation, I will provide, for frame synchronizing: on the one hand, amplitude modulated pulses, shown at 3, (which may, by way of example only, have a frequency of 50 cycles per second and a length of 5 $\mu$s.) and, on the other hand, frequency modulated pulses, for instance constituted by a modulation of the carrier, as shown at 4, during a suitable time interval.

The duration of these signals 3, or 4, will be suitably chosen, it being understood that it is of interest, according to another feature of the invention and at least for the amplitude pulses 3, to manage so that this duration is shorter than the interval between two line pulses 1, that is to say shorter than the duration *d* of a line and even, preferably shorter than the duration of half a line in the case of interlacing. The positions 3' and 4' of the frame pulses correspond to the interlaced frame portion.

I thus avoid, even for amplitude modulated pulses, interruption of the frame synchronizing pulses 3 and 4, as they are being transmitted, by the line synchronizing pulses 1 and vice versa.

In the usual interlaced line system, I will for instance manage so that pulse 3, relative to one of the two interlaced frame portions, occurs during the first half of interval $d$ (solid line), whereas the pulses 3 relative to the second frame element occur in the second half (dotted line). I may, but by way of example only, use 819 lines per complete picture of two interlaced frames. A similar arrangement may be adopted for pulses 4 and 4'.

As for the relative position of the two series 3 and 4 on the carrier, the interval between a pulse 3 and the corresponding pulse 4 is to remain constant (possibly adjustable), this interval being for instance equal to $d$, whereas pulse 3 and pulse 4 occur in intervals corresponding respectively to two successive lines.

Figure 1:
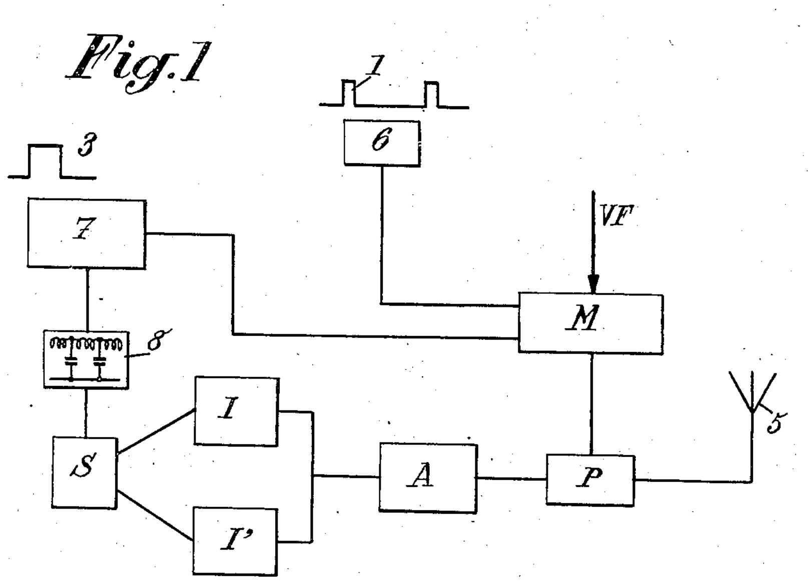
Fig. 1 is a lay-out of a television transmitter according to my invention.

In order to comply with these conditions, at the transmitter, I may proceed as shown by Fig. 1.

I and I' are two oscillators which may be of the type shown, for example, in the De France Patent No. 2,356,568, capable of producing, respectively, the carrier wave of frequency $f$ and the temporary variations from $f$ to $f'$ for the frequency modulated pulses 4 (it being understood that any other system, in particular with a single pilot oscillator tuned to frequency $f$ and a device for passing $f$ to $f'$ might be provided).

A is the amplifier stage and P the power stage which may be of the type shown, for example, in the patents to Hardwick No. 2,187,782 or Labin No. 2,247,442 having its output connected with antenna 5.

M is a modulator which may be of the type shown, for example, in the Browne Patent No. 2,212,199 which receives simultaneously, for imparting them to the carrier, the videofrequency signals VF, the line pulses coming from a device 6 capable of producing them, and the frame pulses 3 coming from another device 7.

A device S serves to control the shifting from I to I' or inversely. It is operated at the rate of transmission of pulses 3, that is to say from a device such as 7, and with the interposition of means, such as a lag line 8, to keep the proper constant interval (in this case equal to $d$) between the pulse 3 transmitted on the carrier and the frequency pulse 4 that follows it.

Device S will be constituted by any known electronic trigger device, in particular such as described in said prior applications.

In this way, the complex transmission thus obtained (according to Fig. 2) can be received both by receivers including means for separating amplitude modulated pulses and by receivers including, as disclosed in particular in said applications, means for separating frequency modulated pulses.

Figure 3:
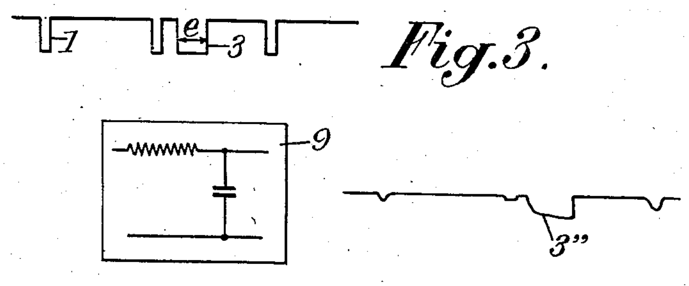
Fig. 3 shows an integrating device to be included in a receiver for use according to my invention.
Figure 4:
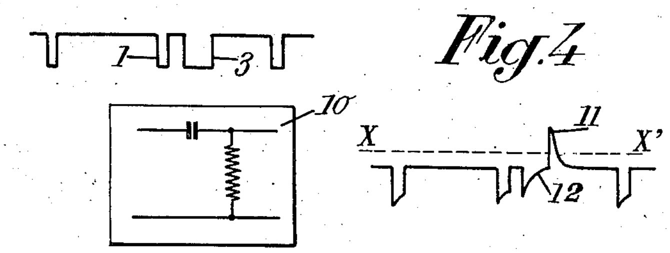
Fig. 4 shows a differentiating device to be included in a receiver according to another embodiment of my invention.

It should be noted that, for separating the amplitude pulses 3 at the receivers, I may use, in particular: either integrating circuits, such as 9 (Fig. 3) which are unresponsive to line pulses 1 and let only pass pulses 3, at 3'', or differentiating circuits 10, producing, for longer pulses, that is to say for pulses 3 or 3', a double signal such as 12, the top 11 of which is clipped, beyond the clipping line XX', in a suitable clipping tube (Fig. 4).

This last solution seems to be preferable, account being taken of the relatively short duration $e$ of pulses 3 with respect to that of pulses 1.

Television transmissions as above described can be received in all receivers of existing types, even those which permit of separating only amplitude modulated pulses.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claim.

What I claim is:

A television transmitter which comprises, in combination, an oscillator device capable of generating a carrier wave of either of two different frequencies, means connected with the output of said oscillator device for transmitting the carrier wave supplied by said device, a synchronizing pulse generator, means connected to the output of said synchronizing pulse generator for amplitude modulating the carrier wave between the output of said oscillator device and said transmitting means in response to the production of pulses by said synchronizing pulse generator, means coupled with said oscillator device for shifting the working frequency thereof from one to the other of the above mentioned frequencies, and means interposed between said synchronizing pulse generator and said shifting means for subjecting to a predetermined delay the operation of said shifting means with respect to the production of synchronizing pulses by said oscillating pulse generator.

ARMAND VORMS.

REFERENCES CITED

The following references are of record in the file of this patent:

UNITED STATES PATENTS

| Number | Name | Date |
|---|---|---|
| 2,151,149 | Poch | Mar. 21, 1939 |
| 2,202,613 | Urtel | May 28, 1940 |
| 2,204,061 | Andrieu | June 11, 1940 |
| 2,308,375 | Loughren | Jan. 12, 1943 |
| 2,435,736 | Carnahan | Feb. 10, 1948 |